United States Patent
Cottingham

(10) Patent No.: US 6,339,761 B1
(45) Date of Patent: Jan. 15, 2002

(54) INTERNET SERVICE PROVIDER ADVERTISING SYSTEM

(76) Inventor: Hugh V. Cottingham, 49 Mountain Ave., Caldwell, NJ (US) 07006

( * ) Notice: Subject to any disclaimer, the term of this patent is extended or adjusted under 35 U.S.C. 154(b) by 0 days.

(21) Appl. No.: 09/312,072

(22) Filed: May 13, 1999

(51) Int. Cl.[7] .............................................. G06F 17/60
(52) U.S. Cl. ...................................................... 705/14
(58) Field of Search .............................. 705/10, 14, 16; 709/217, 219

(56) References Cited

U.S. PATENT DOCUMENTS

| 6,029,045 A | * | 2/2000 | Picco et al. .................... 725/34 |
| 6,134,532 A | * | 10/2000 | Lazarus et al. ................ 705/14 |
| 6,226,648 B1 | * | 5/2001 | Appleman et al. ........... 707/102 |

FOREIGN PATENT DOCUMENTS

| WO | WO 98/34189 | * | 8/1998 | ................... 705/14 |

OTHER PUBLICATIONS

Press Release: "NetZero Launches New Advertising–driven, Free Internet Access Sevice; Startup to Combine Complimentary Access with Targeted, Personalized Ads", http://www.netzero.net/company/19981019nzlaunch.html 10/98.

* cited by examiner

Primary Examiner—Stephen Gravini
(74) Attorney, Agent, or Firm—Stroock & Stroock & Lavan LLP

(57) ABSTRACT

The present invention advantageously provides to Internet Service Providers (ISP) precise control over who receives an advertisement. Thus, in accordance with the present invention, an ISP provider may now offer advertisers precision advertising. An ISP provider has access to precise demographic data on each of the ISP's customers. The ISP provider also has access to data on the periods of usage, including the type of customers accessing the Internet during such periods of usage. With this information, which is available only to the ISP provider, a profile may be compiled by the ISP provider that provides precise information on the ISP customers (e.g., demographic data) and the periods of heaviest Internet access by the various different ISP customer groups (e.g., 20–35 year old males, retired persons, children, etc.).

15 Claims, 4 Drawing Sheets

INTERNET SERVICE PROVIDER ADVERTISING SYSTEM

BACKGROUND OF INVENTION

The present invention is directed to Internet advertising and, more particularly, to an Internet Service Provider (ISP) advertising system that places control of Internet advertising with the ISP.

Internet advertising revenue was almost $2 billion in 1998, according to surveys by the Internet Advertising Bureau. This was up from $906 million in 1997, and $267 million in 1996. There is no doubt that the Internet has arrived as a legitimate advertising medium.

For an advertiser, the value of advertising is the ability to direct an advertisement to a specific group of consumers. Thus, control over the advertisement in terms of when, where, how, to whom, etc., an advertisement is communicated is of paramount importance to the advertiser. Internet advertising is currently controlled primarily by the Internet content providers. An advertiser decides to place an ad on a particular content provider's web-page with the hope that persons that access that web-page are potential consumers of the advertiser's products. However, there is no guarantee that this is the case. Moreover, the content provider can provide no assurance to the advertiser that a particular ad will be directed to a specific group of consumers. This is true because content providers typically do not have access to demographic data about visitors to their web-pages. Furthermore, even if a content provider has access to their visitor's demographic data, web-page advertising is not linked to that demographic data but rather, indiscriminately displayed to every visitor to that web-page. Consequently, Internet advertisers cannot ensure that their ads are reaching a desired target audience of potential consumers and, in fact, cannot control the audience of their ads at all.

SUMMARY OF THE INVENTION

The present invention advantageously provides to advertisers what traditional forms (e.g., print, radio, television, etc.) of advertising have, as yet, been unable to provide— precise control over who receives an advertisement. Thus, in accordance with the present invention, an ISP provider may now offer advertisers precision advertising and an advertisement may be communicated from an ISP to one or more ISP customers based upon various criteria. For example, an advertiser may desire maximum exposure for an advertisement without regard for a particular target audience. Such advertisers will pay the ISP to communicate an advertisement during peak Internet usage times. Alternatively, an advertiser may want to reach a particular group of customers (e.g., 18–25 year-old males). In this case, the ISP can communicate an advertisement to ISP customers having a desired demographic make-up.

An ISP provider has access to precise demographic data on each of the ISP's customers. The ISP provider also has access to data on the periods of usage, including the type of customers accessing the Internet during such periods of usage. With this information, which is available only to the ISP provider, an Internet usage profile may be compiled by the ISP provider that provides precise information on the ISP customers (e.g., demographic data) and the periods of heaviest Internet access by the various different ISP customer groups (e.g., 20–35 year old males, retired persons, children, etc.). With this information, the ISP can offer advertisers numerous ways to ensure that their advertisements reach the desired audience, which ensures that advertising dollars are well-spent.

The precision advertising provided by the present invention means that an advertisement may be directed to a specific, identifiable ISP customer, with the knowledge that ISP customer is a potential consumer of the advertiser's goods and/or services. Thus, the ISP provider can assure its advertisers that advertisements are directed to and reach an advertiser's potential consumers. No such assurance can be provided with other available forms of advertising, whether on the Internet or otherwise.

The precision advertising provided by the present invention also means that an advertisement may be broadcast to every ISP customer accessing the Internet at a particular time. In one example, an advertisement may be broadcast from the ISP to every ISP customer on-line at a particular time, where the ISP has been determined that the ISP customers accessing the Internet at that time are likely to be potential consumers of an advertiser's goods and/or services. In another example, an advertisement may be broadcast from the ISP to every ISP customer online during times of peak usage by the ISP customers.

In an embodiment of the present invention, an ISP, in response to a request for information from an ISP customer to an Internet content provider, receives a web-page, including an advertisement, from the Internet content provider. The ISP removes the advertisement from the received web-page and inserts a desired advertisement in the received web-page. Alternatively, the ISP may not remove embedded advertising from the received web-page, yet still insert the desired advertisement therein. The ISP then communicates the received web-page, including the inserted desired advertisement, to the ISP customer.

In another embodiment of the present invention, an ISP communicates a desired advertisement to a plurality of ISP customers. The ISP receives a plurality of web-pages from a plurality of content providers in response to requests from a plurality of ISP customers. The ISP then inserts a desired advertisement in each of the received web-pages and communicates the modified received web-pages to each of the plurality of ISP customers.

The present invention is also directed to a system of Internet advertising, wherein, in the transfer of digital content on the Internet, such as a web-page, video, streaming video, audio, streaming audio, graphics etc., from an ISP to an ISP customer or client (i.e., online user), the ISP, using a computer program automatically inserts advertising, or appends advertising, or attaches advertising, or otherwise causes advertising to be transferred with the digital content.

The present invention is further directed to a system of Internet advertising, wherein, in the transfer of digital content on the Internet, such as a web-page, video, streaming video, audio, streaming audio, graphics etc., from an ISP to an ISP customer, the ISP, using a computer program automatically removes existing advertising from the digital content and then inserts new advertising, or appends new advertising, or attaches new advertising, or otherwise causes new advertising to be transferred with the digital content.

The present invention is additionally directed to a system of Internet advertising, wherein, in the transfer of digital content on the Internet, such as a web-page, video, streaming video, audio, streaming audio, graphics etc., from an ISP to an ISP customer, the ISP, using a computer program automatically inserts, or appends, or attaches, or otherwise causes the same advertisement to be transferred with a multiplicity of various different digital content (various different web-pages, videos, streaming videos, audio, streaming audio, graphics, etc.) to a plurality of ISP customers at substantially the same time.

The present invention is also directed to a system of Internet advertising, wherein, in the transfer of digital content on the Internet, such as a web-page, video, streaming video, audio, streaming audio, graphics etc., from an ISP to an ISP customer, the ISP, using a computer program automatically inserts, or appends, or attaches, or otherwise causes the same advertisement to be transferred, irrespective of the digital content being transferred, to a plurality of ISP customers at substantially the same time.

The present invention is further directed to a system of Internet advertising, wherein, in the transfer of digital content on the Internet, such as a web-page, video, streaming video, audio, streaming audio, graphics etc., from an ISP to an ISP customer, the ISP, using a computer program automatically inserts, or appends, or attaches, or otherwise causes various different advertisements to be transferred, irrespective of the digital content being transferred, to a plurality of ISP customers at substantially different times.

The present invention is additionally directed to a system of Internet advertising, wherein, in the transfer of digital content on the Internet, such as a web-page, video, streaming video, audio, streaming audio, graphics etc., from an ISP to an ISP customer, the ISP, using a computer program automatically inserts, or appends, or attaches, or otherwise causes a plurality of various different advertisements to be transferred with the same digital content (the same web-page, video, streaming video, audio, streaming audio, graphics, etc.) to a plurality of ISP customers.

The present invention is also directed to a system of Internet advertising, wherein, in the transfer of digital content on the Internet, such as a web-page, video, streaming video, audio, streaming audio, graphics etc., from an ISP to an ISP customer, the ISP, using a computer program automatically causes new advertising to be displayed with the digital content.

The present invention is further directed to a system of Internet advertising, wherein, in the transfer of digital content on the Internet, such as a web-page, video, streaming video, audio, streaming audio, graphics etc., from an ISP to an ISP customer, the ISP, using a computer program automatically causes advertising to be displayed first, for a predetermined period before the display of the digital content, and then the advertising displays with the digital content.

present invention is additionally directed to a system of Internet advertising viewer verification, wherein an ISP, using a computer program, automatically inserts, or appends, or attaches, or otherwise causes various advertising to be transferred with digital content to a plurality of ISP customers and using a computer program, the ISP automatically monitors, collects, and archives, demographic information of the ISP customers that received a particular advertisement at a particular time, for use by the sponsors of the advertisements.

It is thus an object of the present invention to provide a method of Internet advertising that assures advertisers that their advertisements are directed to and reach the advertiser's potential consumers.

It is yet another object of the present invention to provide an Internet advertising method by which an advertisement may be broadcast to every ISP customer accessing the Internet at a particular time.

Still other objects and advantages of the invention will in part be obvious and will in part be apparent from the specification and drawings.

The invention accordingly comprises the several steps and the relation of one or more of such steps with respect to each of the others thereof, which will be exemplified in the disclosure provided hereinafter, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PRESENTLY PREFERRED EMBODIMENTS

Figure 1:
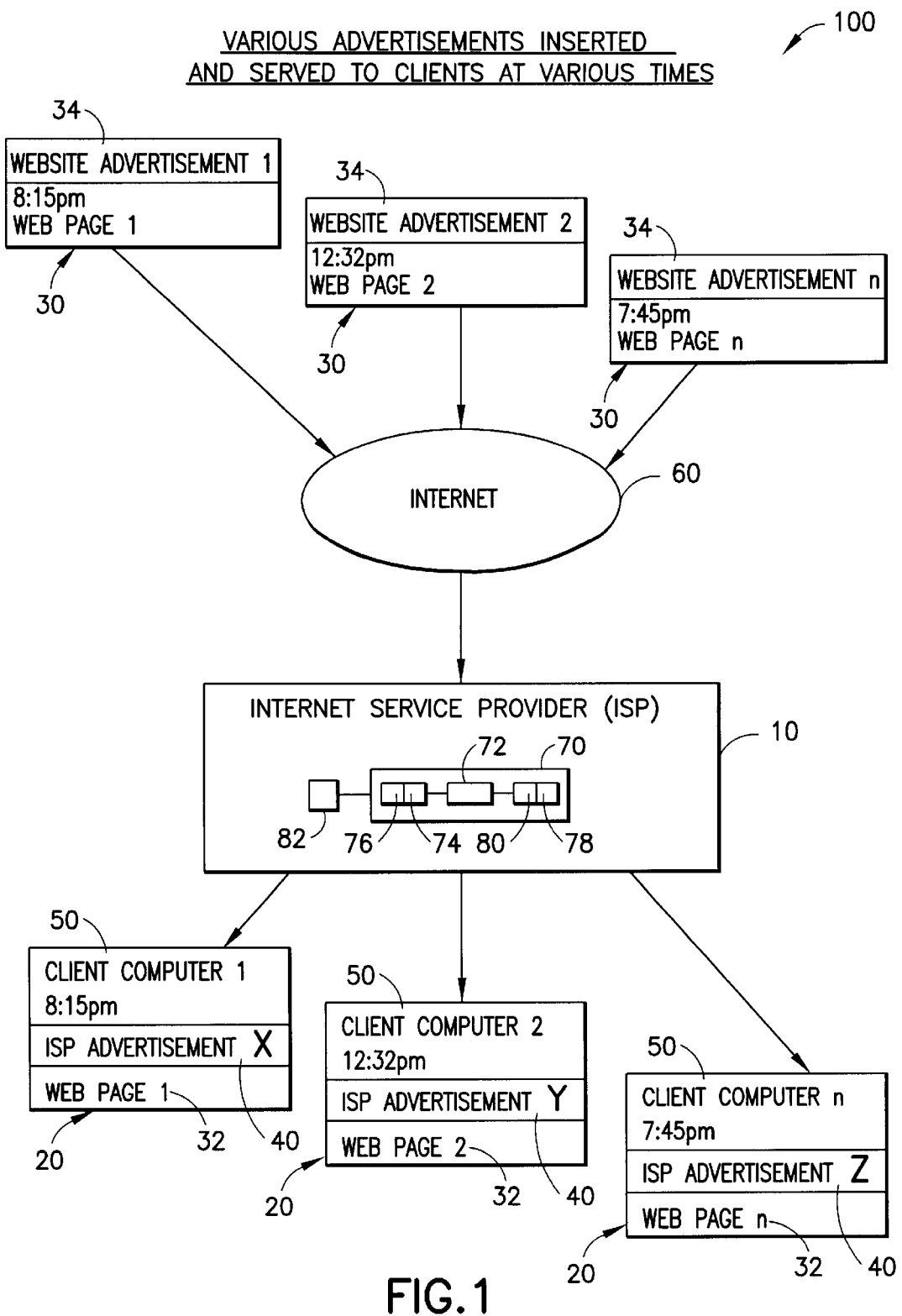
FIG. 1 is a block diagram of a communications network in which the method of the present invention may be implemented.

The present invention is directed to an Internet Service Provider (ISP) advertising system that places control of Internet advertising with an Internet Service Provider (ISP) and the ensures that Internet advertising is directed to and reaches its desired audience. The present invention is preferably carried out by an ISP or Internet portal company, using a computer 70 connected to the Internet 60 and to a plurality of ISP customers 20. The computer 70 may include a central processing unit (CPU) 72, memory devices including RAM 74, ROM 76, a hard disk unit 78, and a removable disk unit 80 (e.g., a floppy disk, CD-ROM, etc.), input and output devices 82 (e.g., keyboard, cursor-control device, printer, display, etc.), operating system software, and application specific computer program 90 for carrying out the steps of the inventive method.

It is known that the Internet comprises multiple, co-existing ISPs. Some ISPs are associated with content providers (i.e., content provider-side ISPs), while other ISPs are associated with Internet users (i.e., customer-side ISPs), also referred to herein as ISP customers, clients, or on-line users. Control of Internet advertising in accordance with the present invention is provided by the customer-side ISP, as opposed to the content provider, as is currently the case. Thus, reference herein to an ISP is intended to indicate a customer-side ISP, unless otherwise indicated.

Referring now to the drawings, the present invention will now be discussed in detail. In FIG. 1 there is depicted a communications network 100 that includes the Internet 60 having a plurality of content providers 30 connected thereto. A customer-side Internet Service Provider (ISP) 10 is also connected to the Internet 60 and to a plurality of ISP customers 20, each having a computer 50, access terminal, or other device for communicating with the Internet 60. Communication between the ISP 10 and each of the plurality of content providers 30 is through the Internet 60, and the ISP customers 20 can only communicated with the content providers 30 through the ISP 10 and Internet 60. The ISP 10 typically includes a computer 70 operable for communicating with the plurality of ISP customers 20 and for facilitating communication between the ISP customers 20 and the plurality of content providers 30 via the Internet 60, effectively operating as a portal through which communication between an ISP customer 20 and any of a plurality of content providers 30 is achieved.

Each content provider 30 may provide information, typically upon request from an ISP customer 20, that may include a web-page 32. A web-page 32 may include various types of information such as, for example, video, streaming video, audio, streaming audio, textual, graphical, pictorial, video, voice, music, links to other web-pages, and various other information now known and hereafter developed. The web-page 32 may also include one or more advertisements 34 that are typically provided by and controlled by the content provider 30. The advertisements 34 in the web-page 32 are indiscriminately communicated to an ISP customer 20 and may be so communicated each time an ISP customer 20 requests information from the content provider 30. Thus, when an ISP customer 20 requests information from a content provider 30, a web-page 32 is communicated from the content provider 30 over the internet 60 and through the ISP 10 before reaching the ISP customer 20. Information included in the web-page 32, including an advertisement 34 embedded therein, travels with the web-page 32 undisturbed, to the ISP customer 20. Advertising in this manner may be considered general advertising in the sense that there is no way to assure that the ISP customer 20 is a potential consumer of the advertiser's goods and/or services. This approach to Internet advertising assumes that ISP customers 20 requesting information (in the form of a web-page 32) from a particular content provider 30 are predisposed to purchase particular goods and/or services. For example, an auto manufacturer is likely to advertise with a content provider associated with auto racing. However, there is simply no guarantee that ISP customers accessing the auto racing web-page are potential consumers of the auto manufacturer's goods. Consequently, an advertiser's advertising dollars are not being well-spent.

The advertising system provided in accordance with the present invention overcomes the shortcomings of current Internet advertising, and also achieves a level of precision in advertising that has heretofore been unavailable with conventional advertising methods. With continued reference to FIG. 1, the ISP 10, in response to a request for information from an ISP customer 20 to a content provider 30, receives a web-page 32 from the content provider 30 that may or may not include an advertisement 34. The ISP 10 may insert a desired advertisement 40 in the web-page 32 and communicate the modified web-page 32 to the ISP customer 20. If the web-page 32 received by the ISP 10 includes an advertisement 34 or a plurality of advertisements, the ISP 10 may remove all or fewer than all such advertisements 34 before inserting a desired advertisement 40 and communicating the modified web-page 32 to the ISP customer 20.

In accordance with the present invention, the ISP 10 now controls advertising on the Internet. Advertisers will pay the ISP 10 to communicate their respective ads to ISP customers 20. The ISP 10 has access to various data regarding the usage habits and demographic make-up of its customers. With this information, the ISP 10 can offer advertisers various different criteria for determining when an advertisement should be communicated to ISP customers. For example, some advertisers may desire to reach the broadest audience possible and will therefore elect to communicate an advertisement to every ISP customer 20 accessing the Internet during periods of peak Internet usage by the ISP customers (an anyone, anytime approach). Some advertisers may desire to target a specific group of potential consumers of their goods and/or services. These advertisers may elect to communicate their advertisements only when selected ISP customers 20 are accessing the Internet. Various other criteria may be used by the ISP 10 and advertisers to determine who (i.e., which ISP customers 20) will receive a particular advertisement.

Since the ISP 10 has access to specific, demographic information for all of its customers, the ISP 10 can determine the demographics for the particular ISP customer 20 making the request of the content provider 30, and insert an advertisement 40 (i.e., a desired or ISP advertisement) that is directed to a potential consumer having a similar demographic make-up. Thus, the ISP 10 can compile a profile for each of its customers 20 that includes demographic information such as, for example, age, sex, geographic location, Internet usage information (e.g., favorite content providers, periods of peak usage and access, etc.), purchasing preferences, etc. The profile can be used by the ISP 10 to match an advertiser's goods and/or services with a potential consumer of those goods and/or services, as identified by the profile. The ISP 10 can therefore communicate specific advertisements to specific ISP customers 20, where the demographics of a specific ISP customer 20 are similar to demographics of an advertiser's potential consumers.

Each ISP customer 20 depicted in FIG. 1 may have a different demographic make-up. Consequently, in accordance with one embodiment of the present invention, requests for information from each ISP customer 20 result in a different desired advertisement 40 being inserted by the ISP 10. Thus, when a first ISP customer 20 requests information from a first content provider 30 at 8:15 AM, the ISP 10 communicates a particular advertisement, advertisement X, to that first ISP customer 20. Likewise, when a second ISP customer 20 request information from a second (or from the same) content provider 30 at 12:32 PM, the ISP communicates advertisement Y to the second ISP customer 20. In this example, the ISP 20 may select a particular advertisement to communicate to its customers 20 based upon the demographic make-up of a particular customer, the time of day the customer is accessing the Internet, a combination of these or various other criteria.

Figure 3:
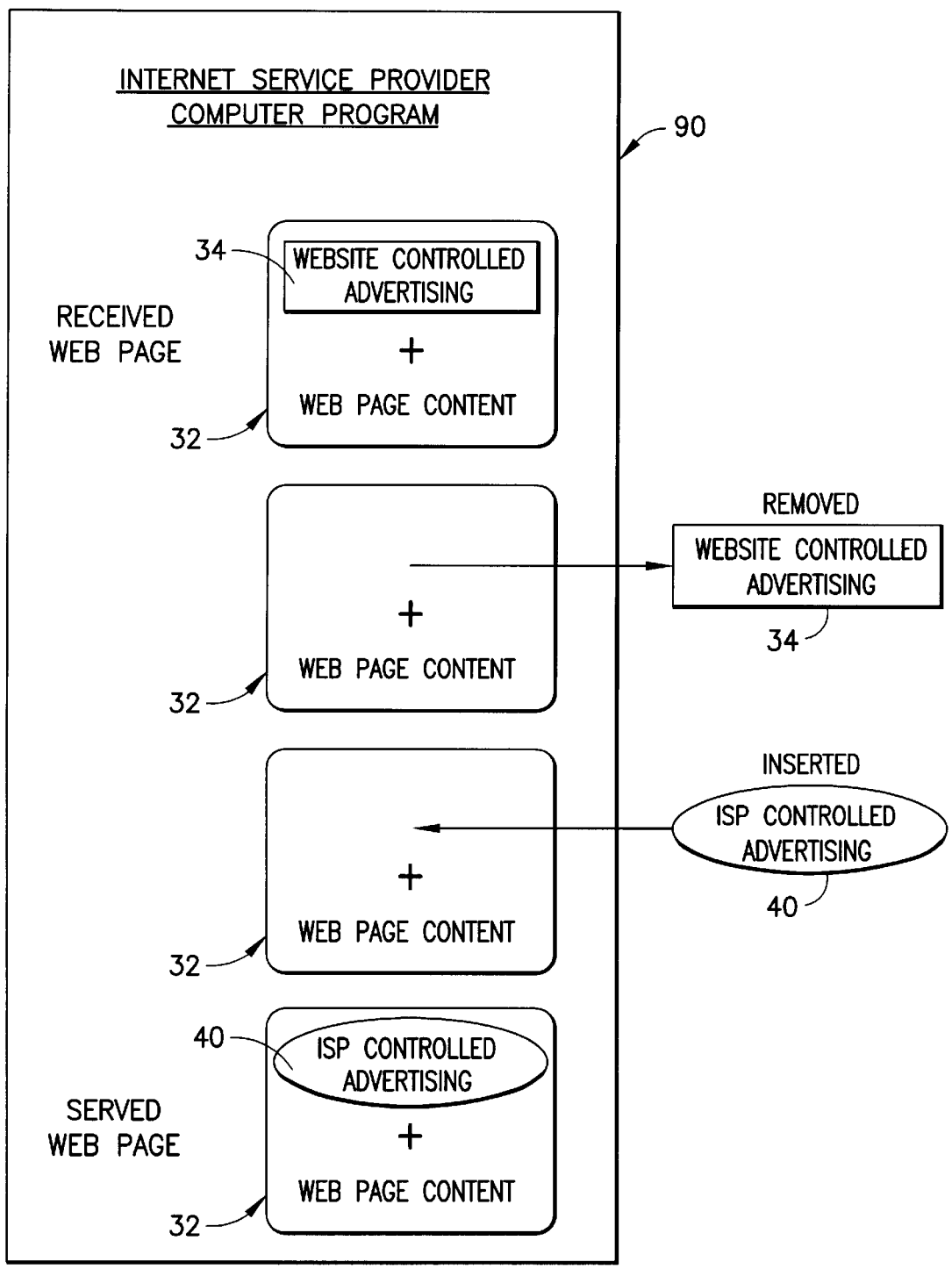
FIG. 3 is a block diagram of one embodiment of the method of the present invention.

When an ISP 10 receives a web-page 32 in response to a request by an ISP customer 20 to an Internet content provider 30, that web-page 32 will typically include an advertisement 34. The present invention provides the ISP 10 with the ability to insert a desired or ISP advertisement 40 in the requested web-page 32, and either remove the embedded advertisement 34 or leave it in place. The block diagram of FIG. 3 depicts the case where the present invention removes an advertisement 34 provided with a web-page 32, and where a computer program 90 provided on the computer 70 of the ISP 10 carries out the steps of the present invention. After the web-page 32 is received by the ISP computer 70, an application specific computer program 90 removes the advertisement 34 provided with the web-page 32 by the content provider 30. Based on various criteria, discussed in detail above, the program 90 selects an advertisement (from a database of available advertisements, for example) for insertion in the web-page 32. The program 90 than inserts the selected advertisement 40 into the web-page 32 and communicates the modified web-page 32 to the ISP customer 20. It will be obvious to persons skilled in the art that the physical location of the advertisements (i.e., the physical location of the database containing the advertisement and any related demographic data) need not be the same physical location as the ISP computer 70.

Figure 4:
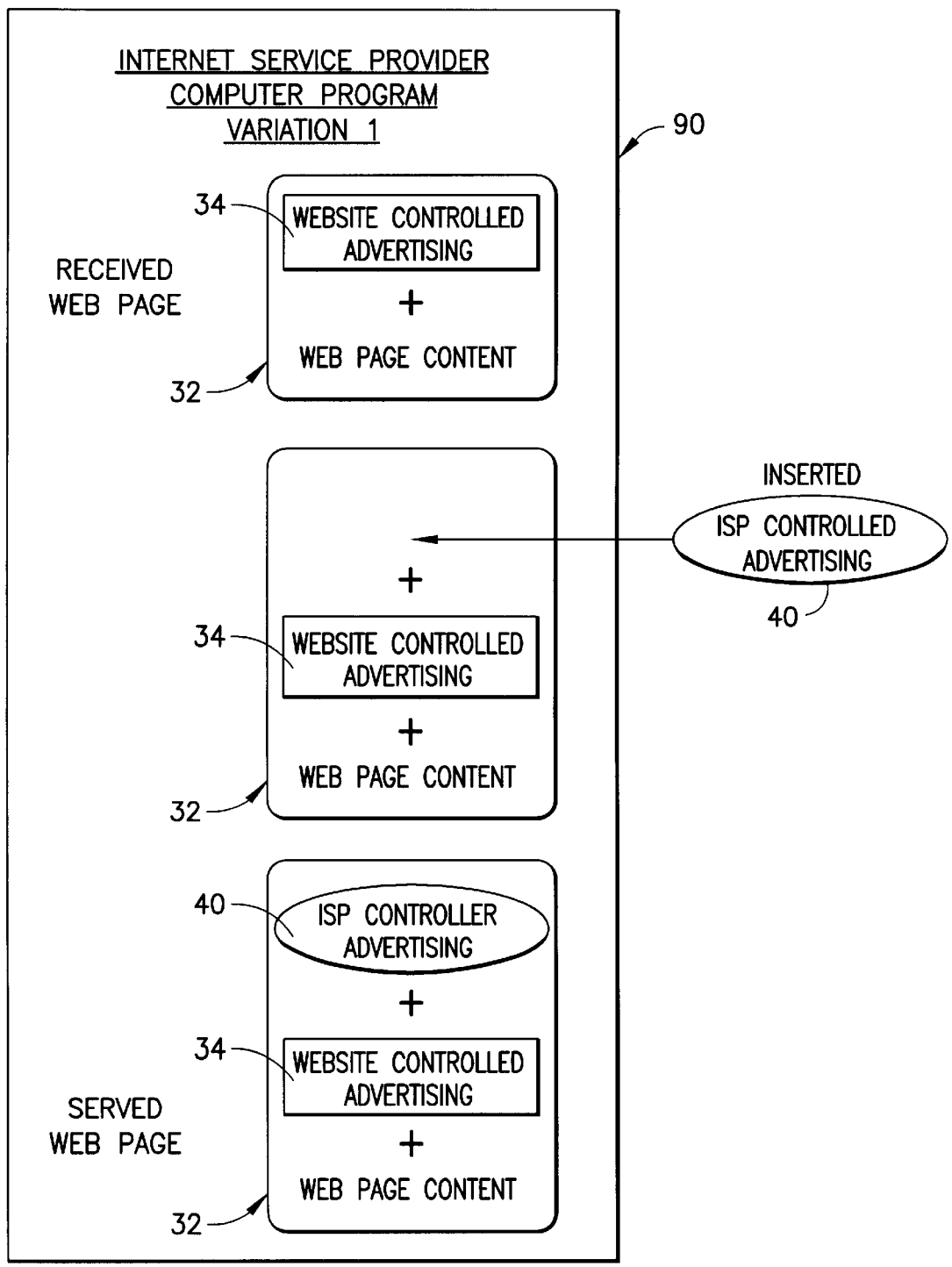
FIG. 4 is a block diagram of an alternative embodiment of the method of the present invention.

Alternatively, and as depicted in FIG. 4, the advertisement 34 provided with the web-page 32 may not be removed by the program 90. Selection of an advertisement and insertion of that ad into the web-page 32 in this embodiment is achieved in substantially the same manner as described above with regard to FIG. 3.

In yet another alternative embodiment, a web-page 32 may be received by the ISP 10 without any advertising. In this embodiment, the present invention communicates an advertisement to the requesting ISP customer 20, either as a page separate from and in addition to the received web-page 32 (in which case the advertisement is communicated to the ISP customer 20 before the received web-page 32), or the advertisement may be inserted into the received web-page 32 and communicated to the ISP customer 20 along with the web-page 32.

Figure 2:
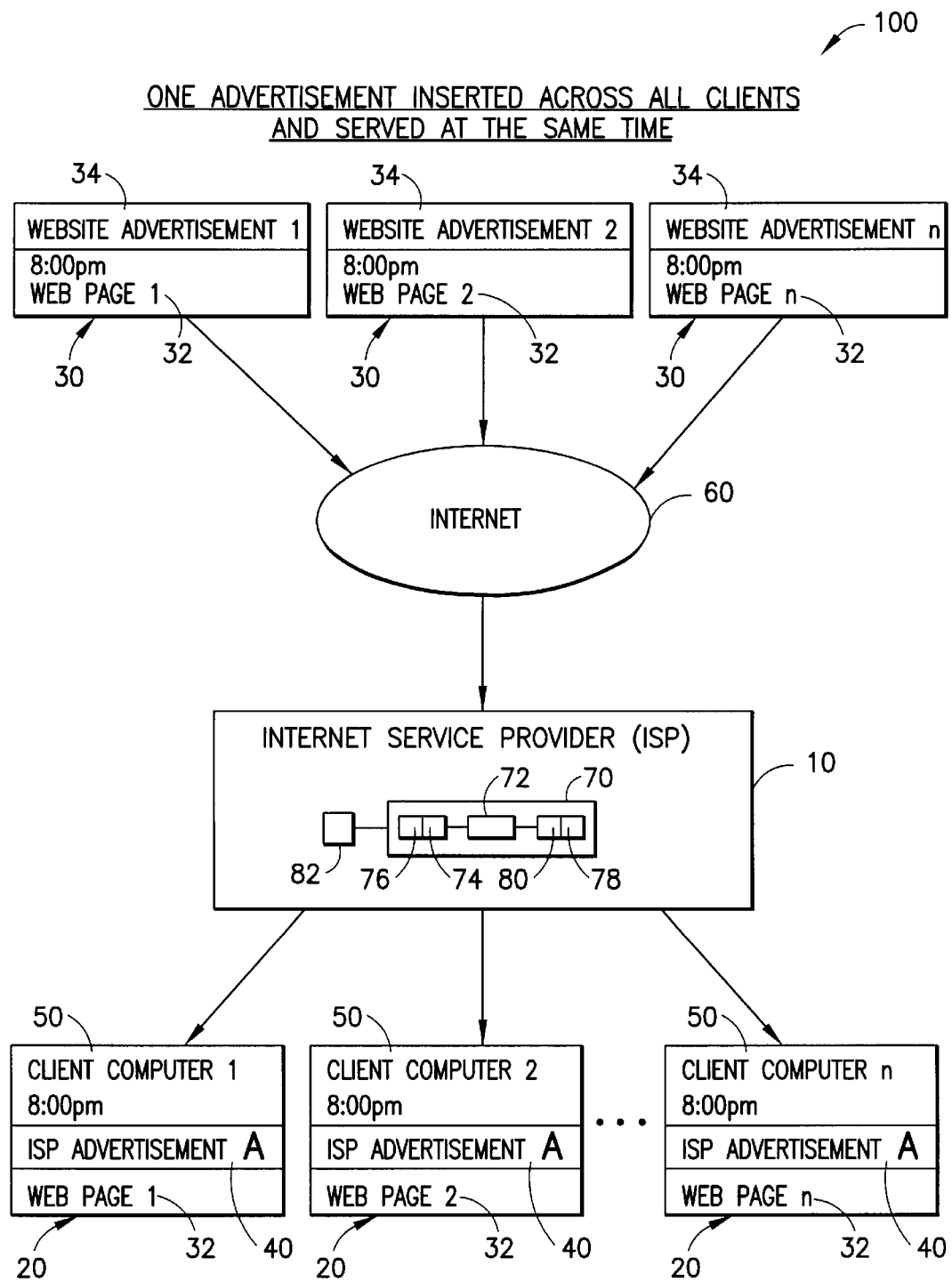
FIG. 2 is a block diagram of a communications network in which the method of the present invention may be implemented.

Referring next to FIG. 2, the present invention is also directed to an ISP advertising system that simultaneously communicates an advertisement to every ISP customer 20 connected to the network 100 at a particular time. In this embodiment, it is desirable that each ISP customer 20 receive the same advertisement 40 at the same time. The ISP 10 has access not only to ISP customer specific information, but also to Internet usage information. The ISP 10 can thus determine periods of peak usage in general, and more specifically, periods of peak usage for predefined demographic groups. For example, the ISP 10 can determine when most 18–25 year old males arc accessing the internet. This information is particularly important to an advertiser who can now, in accordance with the present invention, determine when potential consumers of the advertiser's goods and/or services are most likely to be accessing the Internet and, with greater precision and certainty, direct advertising at these potential consumers. The ISP 10 can thus compile an Internet usage profile that includes information on each of a plurality of ISP customers 20 and that indicates when particular customers are most likely to access the Internet, the length of time certain customers access the Internet, the most frequently visited content providers, demographic make-up of the ISP customers 20, and various other information generally available to the ISP 10. The ISP 10 can then direct specific advertisements to specific types of ISP customers 20 (i.e., to specific potential consumers) by simultaneously communicating a particular advertisement to all ISP customers 20 connected to the Internet at a specific time. As discussed above with respect to FIGS. 3 and 4, the method of this embodiment can be carried out by an application specific computer program 90 provided on the computer 70.

In the embodiment depicted in FIG. 2, the ISP 10 communicates the same advertisement (advertisement A) to each ISP customer 20 accessing the Internet at a particular time. The ISP 10 thus provides its advertisers with information regarding ISP customers 20 that assists the advertiser in deciding the time and repetition with which an advertisement will be communicated from the ISP 10 to its customers 20.

In yet another alternative embodiment, an advertisement (or advertising) may be communicated by the ISP 10 to the ISP customer 20 before the ISP 10 communicates a web-page 32 or other information requested by the ISP customer 20 from a content provider 30. The first-communicated advertisement may be displayed on the computer 50 of the ISP customer 20 for a predetermined period of time before communication of the web-page 32 from the ISP 10 to the ISP customer 20.

It will thus be seen that the objects set forth above, among those made apparent from the preceding description, are efficiently attained and, since certain changes may be made in the above system without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An Internet advertising method for an Internet Service Provider comprising the steps by the Internet Service Provider (ISP) of:
   (a) in response to a request for information from an ISP customer to an Internet content provider, receiving a web-page by the ISP, including an advertisement, from the Internet content provider;
   (b) removing the advertisement from the received web-page;
   (c) inserting a desired advertisement in the received web-page; and
   (d) communicating the received web-page, including the inserted desired advertisement, to the ISP customer.

2. An Internet advertising method as recited by claim 1, wherein a plurality of desired advertisements are available for insertion by the ISP and wherein each of the plurality of desired advertisements is directed to a potential consumer having a predetermined demographic make-up, said step (c) further comprises the steps of:
   determining the demographic make-up of the ISP customer; and
   selecting an advertisement from the plurality of available desired advertisements directed to a potential consumer having a demographic make-up that is similar to the demographic make-up of the ISP customer.

3. An Internet advertising method as recited by claim 1, wherein a plurality of desired advertisements are available for insertion by the ISP, said step (c) further comprises the steps of:
   selecting an advertisement from the plurality of available desired advertisements; and
   inserting the selected advertisement in the received web-page at a predetermined time.

4. An Internet advertising method as recited by claim 1, wherein the ISP customer has a predetermined demographic make-up, and wherein the desired advertisement inserted in said step (c) is directed to a potential consumer having a predetermined demographic make-up that is substantially similar to the ISP customer demographic make-up.

5. A method of communicating a desired advertisement by an Internet Service Provider (ISP) to a plurality of ISP customers, comprising the steps by the ISP of:
   (a) in response to a request for information from a plurality of ISP customers to a plurality of Internet content providers, receiving a plurality of web-pages by the ISP, from the plurality of Internet content providers;
   (b) inserting a desired advertisement in each of the received web-pages; and
   (c) communicating the received web-pages, including the inserted desired advertisement, to each of the plurality of ISP customers.

6. A method of communicating a desired advertisement as recited by claim 5, wherein said step (c) comprises communicating the received web-pages, including the inserted desired advertisement, to each of the plurality of ISP customers at substantially the same time.

7. A method of communicating a desired advertisement as recited by claim 5, wherein said step (c) comprises communicating the received web-pages, including the inserted desired advertisement, to each of the plurality of ISP customers at substantially different times.

8. A method of communicating a desired advertisement as recited by claim 5, wherein the web-page received from the Internet content provider includes an advertisement.

9. A method of communicating a desired advertisement as recited by claim 8, wherein, before said step (b), further comprising the step of removing the advertisement from the received web-page.

10. An Internet advertising method comprising the steps by an Internet Service Provider (ISP) of:

(a) in response to a request for information from an ISP customer to an Internet content provider, receiving a web-page by the ISP from the Internet content provider;

(b) inserting a desired advertisement in the received web-page; and (c) communicating the received web-page, including the inserted desired advertisement, to the ISP customer.

11. An Internet advertising method as recited by claim 10, wherein the web-page received from the Internet content provider includes an advertisement.

12. An Internet advertising method as recited by claim 11, wherein, before said step (b), further comprising the step of removing the advertisement from the received web-page.

13. An Internet advertising method as recited by claim 10, wherein a plurality of desired advertisements are available for insertion by the ISP and wherein each of the plurality of desired advertisements is directed to a potential consumer having a predetermined demographic make-up, said step (b) further comprises the steps of:

determining the demographic make-up of the ISP customer; and selecting an advertisement from the plurality of available desired advertisements directed to a potential consumer having a demographic make-up that is similar to the demographic make-up of the ISP customer.

14. An Internet advertising method as recited by claim 10, wherein a plurality of desired advertisements are available for insertion by the ISP, said step (b) further comprises the steps of:

selecting an advertisement from the plurality of available desired advertisements; and inserting the selected advertisement in the received web-page at a predetermined time.

15. An Internet advertising method as recited by claim 10, wherein the ISP customer has a predetermined demographic make-up, and wherein the desired advertisement inserted in said step (b) is directed to a potential consumer having a predetermined demographic make-up that is substantially similar to the ISP customer demographic make-up.

\* \* \* \* \*